(12) United States Patent
Takada et al.

(10) Patent No.: US 8,625,981 B2
(45) Date of Patent: Jan. 7, 2014

(54) IMAGING APPARATUS

(75) Inventors: Masahiro Takada, Tokyo (JP); Kengo Hayasaka, Tokyo (JP)

(73) Assignee: Sony Corporation, Tokyo (JP)

(*) Notice: Subject to any disclaimer, the term of this patent is extended or adjusted under 35 U.S.C. 154(b) by 248 days.

(21) Appl. No.: 13/074,270

(22) Filed: Mar. 29, 2011

(65) Prior Publication Data

US 2012/0076484 A1 Mar. 29, 2012

(30) Foreign Application Priority Data

Apr. 1, 2010 (JP) .................. 2010-085491

(51) Int. Cl.
*G03B 35/00* (2006.01)
*G03B 9/00* (2006.01)
*H04N 13/02* (2006.01)
*H04N 5/238* (2006.01)

(52) U.S. Cl.
USPC .............. 396/324; 396/458; 348/48; 348/363

(58) Field of Classification Search
USPC .................. 396/324, 452, 458, 459, 505, 510; 348/340, 240.3, 49, 363
See application file for complete search history.

(56) References Cited

U.S. PATENT DOCUMENTS 7,019,780 B1 3/2006 Takuechi et al.

FOREIGN PATENT DOCUMENTS

JP 2001-61165 3/2001

OTHER PUBLICATIONS

Hatada, et al., Induced Effect of Direction Sensation and Display Size—Basic Study of Realistic Feeling with Wide Screen Display, NHK Broadcasting Science Research Laboratories, 1979, pp. 407-413, Tokyo.

*Primary Examiner* — Rochelle-Ann J Blackman
(74) *Attorney, Agent, or Firm* — Sony Corporation

(57) ABSTRACT

An imaging apparatus includes: an image-pickup lens; a shutter partitioned into a plurality of sections along a first direction and allowed to open and close for each of the plurality of sections; a stop adjusting an amount of light; and a drive section driving the shutter and the stop. The drive section controls the shutter in such a manner that any one of the sections of the shutter is opened and the remaining sections are closed, and drives the stop in such a manner that passage of a flux of light through the open section is limited to a larger extent in a second direction than in the first direction, the second direction being orthogonal to the first direction.

10 Claims, 15 Drawing Sheets

IMAGING APPARATUS

CROSS REFERENCES TO RELATED APPLICATIONS

The present application claims priority to Japanese Priority Patent Application JP 2010-085491 filed in the Japan Patent Office on Apr. 1, 2010, the entire content of which is hereby incorporated by reference.

BACKGROUND

The present application relates to an imaging apparatus suitable for acquisition of parallax images for stereoscopic viewing use, for example.

Various types of imaging apparatuses have been previously proposed and developed. As an example, Japanese Unexamined Patent Application No. 2001-61165 describes an imaging apparatus configured to include an image-pickup lens, a liquid crystal shutter, an image-pickup device, and an image processing section. In this imaging apparatus, the liquid crystal shutter is divided into two right and left sections, and on the basis of the sections, the shutter is allowed to open and close. With such a liquid crystal shutter, image-pickup data to be derived by the image-pickup device varies based on which of the right and left sections a light passes through, and based on the image-pickup data, an image to be generated by the image processing section varies, i.e., a parallax image for right eye or a parallax image for left eye. Because these right and left parallax images are the results of the lights passing through such two different sections of the liquid crystal shutter, and have a parallax therebetween. A predetermined display technique is used such that each eye of a user is able to view only one of these two right and left parallax images so that stereoscopic viewing is achieved.

For realizing the stereoscopic viewing as such, possible techniques include polarization and field-sequential, for example. With the polarization technique, using a display affixed with a predetermined polarization filter, right and left parallax images are alternately displayed in horizontal scan lines in the same screen, and with the field-sequential technique, the right and left parallax images are alternately displayed in a time sharing manner. Using a projector is also a possibility. That is, two projectors, which are able to emit differently-polarized image lights polarized in different two directions, are used such that each projector projects only either a right or left parallax image toward the same projection surface. For realizing the stereoscopic viewing, with both the polarization technique and the projector technique, a pair of polarized glasses is used. The polarized glasses allow the differently-polarized lights to pass therethrough, whereas with the field-sequential technique, a pair of shutter glasses is used. The shutter glasses are controlled to open/close in synchronization with display timings of the parallax images. Thus, stereoscopic display is achieved. The stereoscopic depth perception varies depending on the amount of difference, i.e., magnitude of parallax, between the right and left parallax images.

SUMMARY

The issue here is that, in such an imaging apparatus as above, an imaging optical system is provided with an aperture stop. In this aperture stop, the aperture is often shaped like a circle or a polygon being closely analogous thereto. If with such a liquid crystal shutter as described above, i.e., the shutter is divided into two sections for acquisition of the right and left parallax images, the size (radius) of the aperture affects the magnitude of parallax to be created with the right and left parallax images.

On the other hand, the aperture of the aperture stop as such is sometimes configured to be variable in size for control over the amount of light and the depth of focus on the image side (on the object side, the depth of field).

In the imaging apparatus for acquiring the parallax images as such, however, changing the size of the aperture also changes the magnitude of parallax because the size of the aperture affects the magnitude of parallax to be created with the right and left parallax images. As an example, when the aperture is reduced in size with the aim of reducing the amount of light, the magnitude of parallax is reduced, and the stereoscopic depth perception is accordingly impaired, i.e., the resulting picture display appears rather two-dimensional with no depth.

It is thus desirable to provide an imaging apparatus that is able to, during acquisition of a plurality of parallax images, adjust the amount of light with control over parallax to be created with the parallax images not to vary in degree.

An imaging apparatus in an embodiment is provided with an image-pickup lens, a shutter, a stop, and a drive section. The shutter is partitioned into a plurality of sections along a first direction and allowed to open and close for each of the plurality of sections. The stop adjusts the amount of light. The drive section drives the shutter and the stop. The drive section controls the shutter in such a manner that any one of the sections of the shutter is opened, and the remaining sections are closed, and drives the stop in such a manner that passage of a flux of light through the open section is limited to a larger extent in a second direction that in the first direction, the second direction being orthogonal to the first direction.

In the imaging apparatus in the embodiment, the shutter is allowed to open and close for each of the plurality of sections, so that the image-pickup device may acquire image-pickup data based on the flux of light passing through each section of the shutter. At this time, the drive section drives the stop in such a manner that the passage of flux of light through the open section of the shutter is limited to a larger extent in the second direction than in the first direction, the second direction being orthogonal to the first direction. As a result, the open section becomes less changeable dimensionally in the first direction, i.e., in the direction along which the sections of the shutter are arranged, so that a variation in the amount of displacement between the parallax images to be generated based on the image-pickup data as above is reduced.

According to the imaging apparatus of the embodiment, the drive section drives the stop in such a manner that a light entering the open section of the shutter or a light coming therefrom is limited to a larger extent in the second direction than in the first direction, the second direction being orthogonal to the first direction. The variation in the amount of displacement between the resulting parallax images is thus reduced. As such, for acquiring a plurality of parallax images, the amount of light may be adjusted with control over any degree change of parallax with the resulting parallax images.

Additional features and advantages are described herein, and will be apparent from the following Detailed Description and the figures.

BRIEF DESCRIPTION OF THE FIGURES

FIG. 2A shows the shutter whose left section is opened (right section is closed), and FIG. 2B shows the shutter whose right section is opened (left section is closed);

FIG. 4A shows the state thereof without limitation on the passage of a flux of light (aperture is fully opened), and FIG. 4B shows the state thereof with a limitation on the passage of a flux of light (aperture is partially blocked);

FIG. 11A shows the state thereof without limitation on the passage of a flux of light (aperture is fully opened), and FIG. 11B shows the state thereof with a limitation on the passage of a flux of light (aperture is partially blocked);

FIG. 12A shows a case with the aperture having the radius R1, and FIG. 12B shows a case with the aperture having the radius R2;

FIG. 13A shows a state without limitation on the passage of a flux of light (aperture is fully opened), and FIG. 13B shows a state with a limitation on the passage of a flux of light (aperture is partially blocked);

FIG. 17A shows a state without limitation on the passage of a flux of light (aperture is fully opened), and FIG. 11B shows a state with a limitation on the passage of a flux of light (aperture is partially blocked).

DETAILED DESCRIPTION

Embodiments of the present application will be described below in detail with reference to the drawings.

The description will be given in the following order.

1. First Embodiment (an exemplary imaging apparatus of acquiring parallax images while adjusting the amount of light using four blades)

2. Modified Example 1 (an exemplary adjustment of the amount of light using an image-pickup lens having a distribution of transmittance)

First Embodiment (Entire Configuration of Imaging Apparatus 1)

Figure 1:
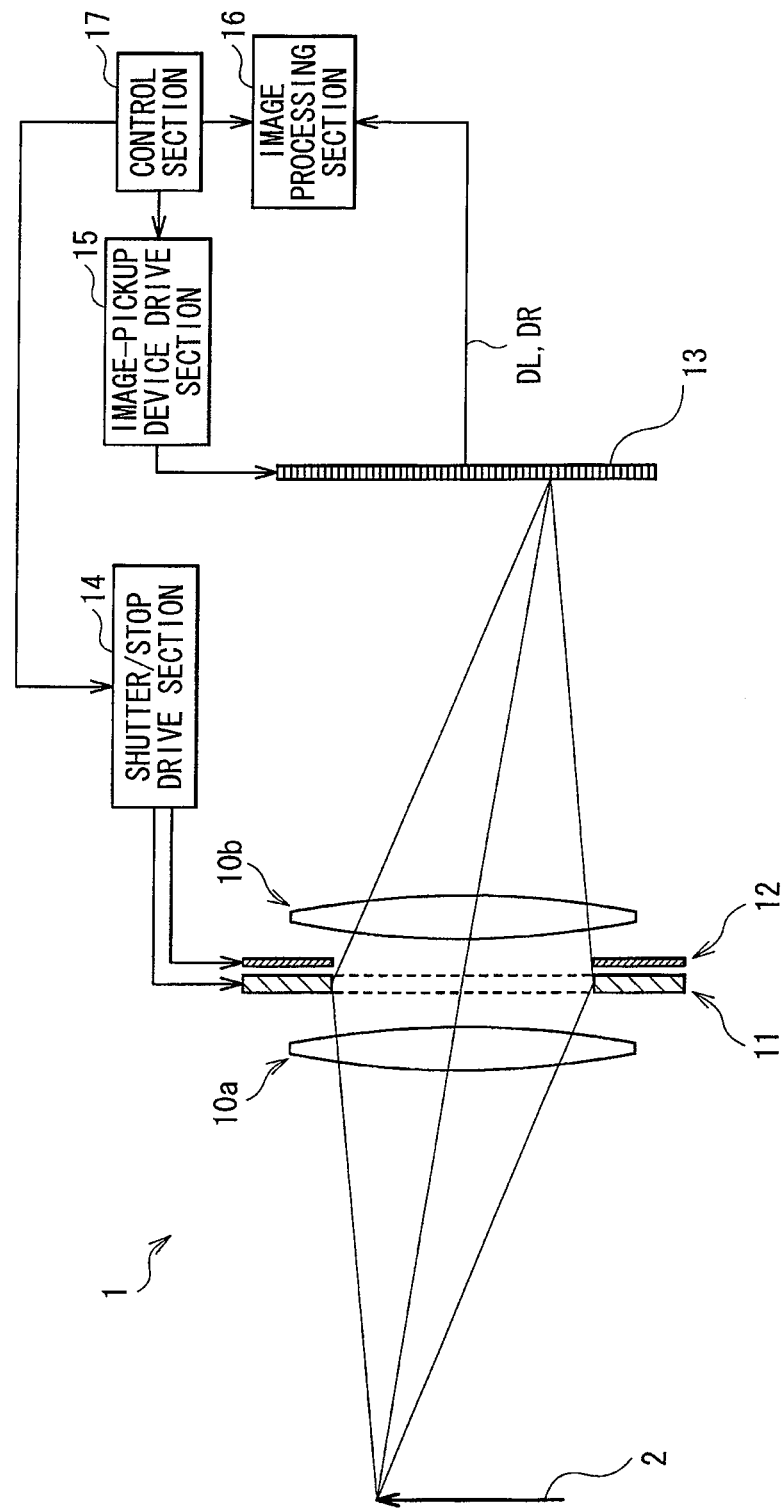
FIG. 1 is a block diagram showing the entire configuration of an imaging apparatus in a first embodiment.

FIG. 1 is a diagram showing the entire configuration of an imaging apparatus (imaging apparatus 1) in a first embodiment. The imaging apparatus 1 is for acquiring a plurality of parallax images, i.e., right and left parallax images in this example, which are images of an imaging target (object) 2. The imaging apparatus 1 is configured to include image-pickup lenses 10a and 10b, a shutter 11, an aperture stop 12, an image-pickup device 13, a shutter/stop drive section 14, an image-pickup device drive section 15, an image processing section 16, and a control section 17.

The image-pickup lenses 10a and 10b are each a main lens for imaging of the imaging target 2, and are each of a general type popularly in use with a video camera, a still camera, and others. In this example, the image-pickup lens 10a is disposed on the shutter 11 side from which lights come, and the image-pickup lens 10b is disposed on the other side thereof from which the lights exit. Herein, the number of the image-pickup lenses, the arrangement thereof, and others are surely not restrictive thereto. Moreover, the image-pickup lenses in use may each be a fixed-focus lens or a variable-focus lens (zoom lens).

(Configuration of Shutter 11)

Figures 2A, 2B:
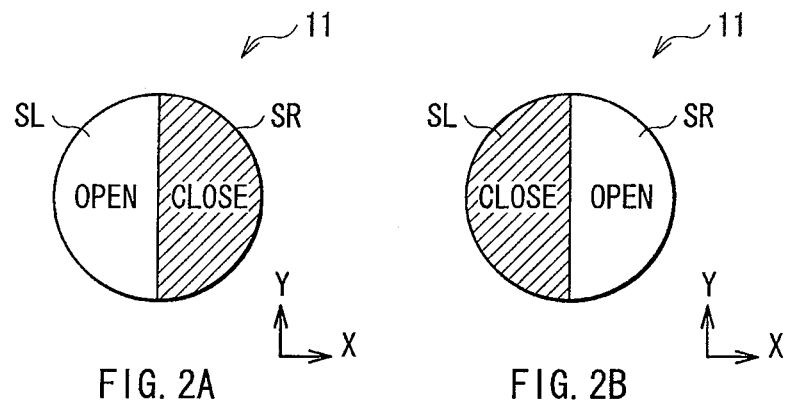
FIGS. 2A and 2B are each a schematic view of a shutter of FIG. 1, showing the configuration thereof in a planar view, and specifically

The shutter 11 is controllably opened and closed for adjusting the time for light exposure to the image-pickup device 13. The shutter 11 is partitioned into a plurality of sections and allowed to open (light emission) and close (no light emission) for each of the plurality of sections. In this example, as shown in FIGS. 2A and 2B, the shutter 11 is configured by two sections SR and SL arranged along the direction of an X axis, and these sections SR and SL are allowed to be individually controlled in terms of transmittance, specifically, controllably changed in state between light transmission and no light transmission. Such control over the sections SR and SL in terms of state change is performed in a time sharing manner to alternately open and close the sections SR and SL. Note that, in this specification, the X-axis direction is assumed to be horizontal (right-and-left direction), the Y-axis direction be vertical (up-and-down direction), and the Z-axis direction be along the optical axis. In these directions, the X-axis direction corresponds to a first direction of the embodiment, and the Y-axis direction corresponds to a second direction of the embodiment.

Figure 3:
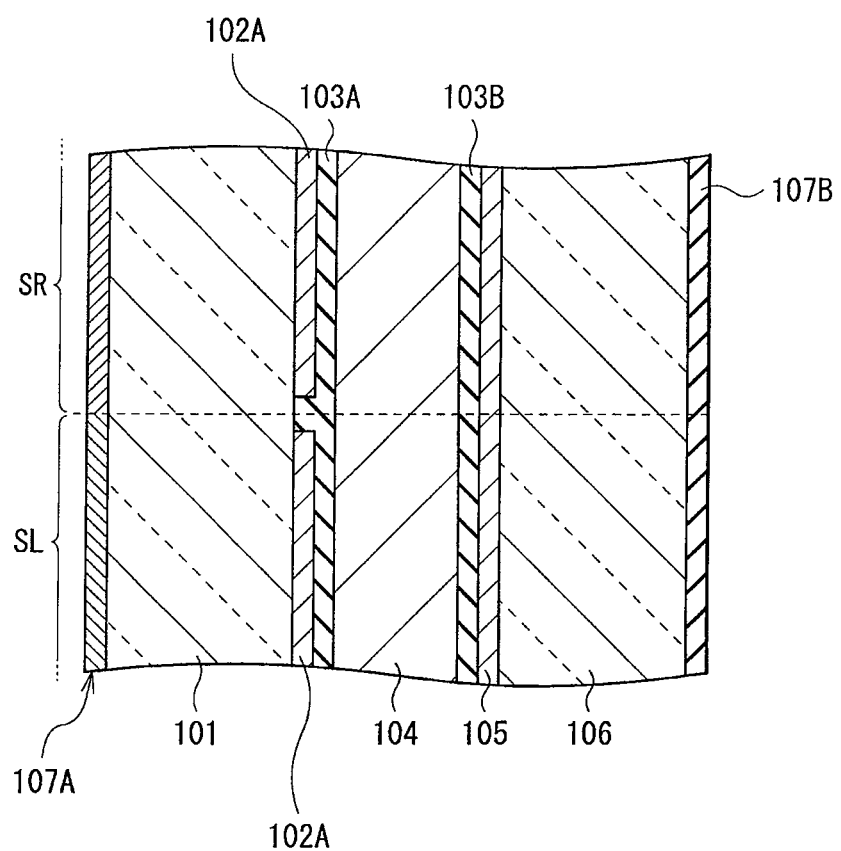
FIG. 3 is a cross sectional view of a liquid crystal shutter, showing the border area and therearound between the right and left sections thereof.

Such a shutter 11 is not specifically restrictive in type, and may be a mechanical shutter or an electric shutter such as liquid crystal shutter as long as it allows optical path switching as described above. As an example of the shutter 11 as such, described now is the configuration of a liquid crystal shutter. FIG. 3 is a cross sectional view of the liquid crystal shutter, showing the border area and therearound between the right and left sections SR and SL thereof.

The liquid crystal shutter includes a liquid crystal layer 104 sealed in between substrates 101 and 106 each made of glass or others. The substrate 101 is affixed with a polarizer 107A on the side where lights come, and the substrate 106 is affixed with an analyzer 107B on the side where the lights exit. Between the substrate 101 and the liquid crystal layer 104, an electrode is formed. The electrode is divided into a plurality of sub electrodes 102A, e.g., in this example, two sub electrodes 102A respectively corresponding to the sections SR and SL. These two sub electrodes 102A are allowed to be individually provided with a voltage supply. Such a substrate 101 is opposing the substrate 106, which is formed with an electrode 105 for shared use by the sections SR and SL. Between the sub electrodes 102A and the liquid crystal layer 104, an alignment film 103A is provided, and between the electrode 105 and the liquid crystal layer 104, an alignment film 103B is provided. The sub electrodes 102A and the electrode 105 are each made of ITO (Indium Tin Oxide), for example, and the liquid crystal layer 104 includes liquid crystal of various display modes, e.g., STN (Super-twisted Nematic), TN (Twisted Nematic), OCB (Optical Compensated Bend), FLC (Ferroelectric Liquid Crystal), and others. The polarizer 107A and the analyzer 107B are each for selectively allowing a predetermined polarized light to pass therethrough, and are so arranged as to be in crossed Nichols or paralleled Nichols, for example.

With such a configuration, the liquid crystal layer 104 is able to be changed in transmittance in accordance with the magnitude and duration length of voltage application thereto via the sub electrodes 102A and the electrode 105. That is, by using such a liquid crystal shutter as the shutter 11, the shutter 11 is able to be changed in state between open and close through control over voltage application as such. Furthermore, by dividing the electrode for voltage application use as such into the two sub electrodes 102A for individual driving, the sections SR and SL is allowed to be changed alternately in state between transmission and no transmission.

As to the shutter 11 as such, the aperture stop 12 is provided in the vicinity of the surface from which lights come or the surface from which the lights exit (in this example, in the vicinity of the surface from which the lights exit). Ideally, the shutter 11 and the aperture stop 12 are placed at the position of a so-called pupil plane of an optical system including the image-pickup lens 10a and 10b. The pupil plane is generally for the passage of a main flux of light coming from each point of the imaging target 2. Through control over the shape of an aperture formed on the pupil plane, the resulting image is allowed to be controlled in terms of brightness (amount of light) without loss of the image at the periphery (without causing vignetting).

(Configuration of Aperture Stop 12)

Figure 4A:
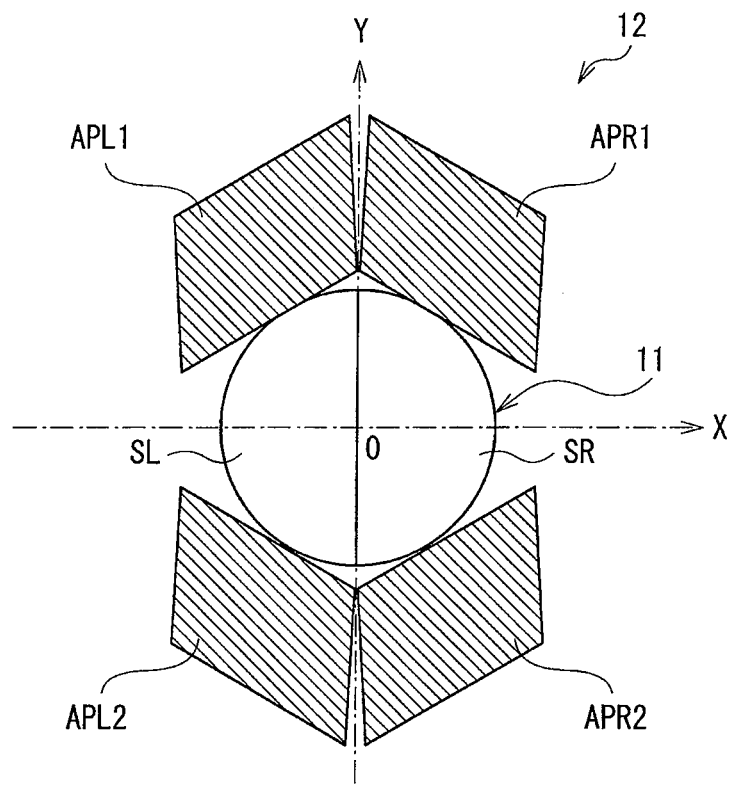
FIGS. 4A and 4B are each a schematic view of an aperture stop of FIG. 1, showing the configuration thereof in a planar view, and specifically
Figure 4B:
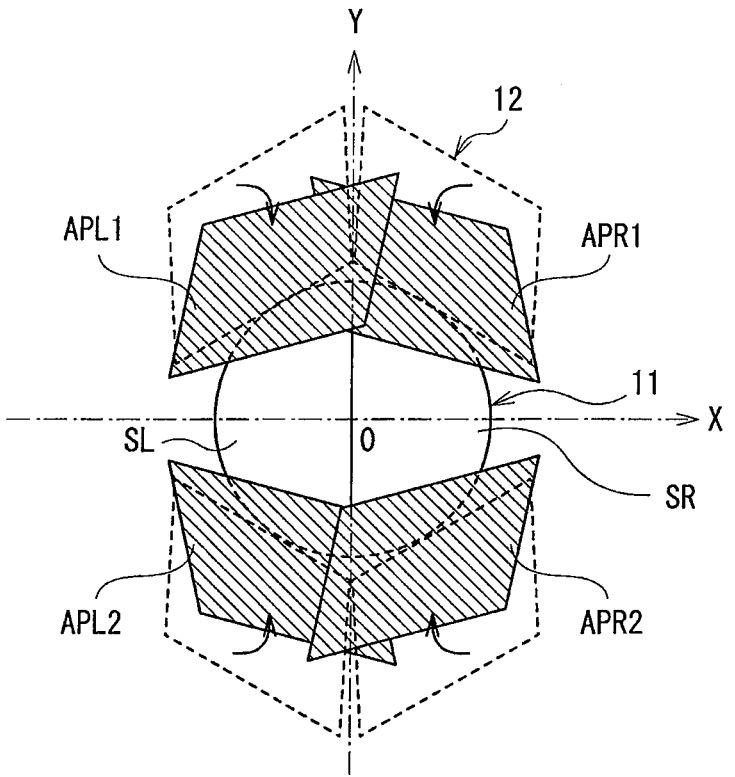

FIGS. 4A and 4B are each a view of the aperture stop 12, showing the configuration thereof in a planar view. In the drawings, the optical axis of the image-pickup lenses 10a and 10b is indicated as an origin (0) (this is applicable also to the following drawings). The aperture stop 12 is the one that limits the passage of a flux of light, and adjusts the amount of light and the depth of focus (depth of field). With such an aperture stop 12, the passage of a flux of light is limited by mechanical control using a plurality of blades. To be specific, limited is the passage of a flux of light that has been passed through the image-pickup lens 10a and the open section of the shutter 11. In this embodiment, the aperture stop 12 is provided with four blades of APL1, APL2, APR1, and APR2, for example. In the below, when there is no need for a specific distinction among such blades, the blades are simply referred to collectively as "blades AP". The blades AP are each made of a light-shielding thin plate, and is in the plane shape of a parallelogram, for example. Such blades AP are each allowed to move along the surface of the shutter 11 from which lights exit, e.g., allowed to rotate or move in parallel, and are each controllably changed in tilt angle and position by degrees by the shutter/stop drive section 14, for example.

When these blades APL1, APL2, APR1, and APR2 are all in the state of no limitation on flux of light (in the fully open state), for example, these are so arranged as shown in FIG. 4A. That is, in the fully open state, the blades APL1 and APR1 are disposed in proximity to each other with the Y axis located therebetween, and the blades APL2 and APR2 are disposed similarly thereto. On the other hand, the blades APL1 and APL2 are disposed away from each other with the X axis located therebetween, and the blades APR1 and APR2 are disposed similarly thereto.

On the other hand, as shown in FIG. 4B, when the blades AP that have been in the fully open state are changed in tilt angle or/and position, the passage of a flux of light is limited, i.e., the passage of a flux of light is partially blocked. In other words, in this embodiment, the two blades APL1 and APL2 are in charge of limiting the passage of a flux of light in the section SL, and the two blades APR1 and APR2 are in charge of limiting the passage of a flux of light in the section SR. Moreover, the blades AP are each allowed to rotate about a rotation axis, i.e., the tilt angle of which is variable, and to shift mainly along the Y-axis direction. With such a configuration, the passage of a flux of light is limited more along the Y-axis direction than along the X-axis direction, i.e., along which the sections SR and SL are arranged. That is, in this example, the passage of a flux of light in the sections SR and SL is limited more in the up-and-down direction than in the right-and-left direction.

The image-pickup device 13 is a photoelectric conversion device that outputs a light receiving signal based on incoming rays of light after the passage through other components, i.e., the image-pickup lens 10a and 10b, the shutter 11, and the aperture stop 12. Such an image-pickup device 13 includes a CMOS (Complementary Metal Oxide Semiconductor), a CCD (Charge-Coupled Device), and others. The image-pickup device 13 is exposed to light whenever the section SR or/and the section SL in the shutter 11 comes into open state, and acquires image-pickup data based on the flux of light which has passed through the corresponding section SR or/and SL. Such an image-pickup device 13 may be provided on the light-receiving side with a color filter (not shown) with a predetermined color array, for example.

The shutter/stop drive section 14 is for driving the shutter 11 to alternately open and close the sections SR and SL, and for driving the aperture stop 12, i.e., the blades AP, in a predetermined manner that will be described later. When the shutter 11 is a liquid crystal shutter, for example, the shutter/stop drive section 14 changes a voltage supply to the sub electrodes of the liquid crystal shutter, thereby alternately opening and closing the sections SR and SL.

The image-pickup device drive section 15 is for driving the image-pickup device 13 to control the light receiving operation thereof.

The image processing section 16 is for performing predetermined image processing to the image-pickup data acquired by the image-pickup device 13, i.e., parallax image data. Such image processing includes sorting of the parallax image data, color interpolation such as demosaicing, and others.

The control section 17 is for controlling the operation of the shutter/stop drive section 14, and that of the image-pickup device drive section 15. Such a control section 17 is exemplified by a microcomputer for use.

(Operation and Effects of Imaging Apparatus 1)
(Basic Operation)

In the imaging apparatus 1 described above, light coming from the imaging target 2 reaches the image-pickup device 13 after passing through the other components, i.e., the image-pickup lens 10a, the shutter 11, the aperture stop 12, and the image-pickup lens 10b in this order. During such a passage, although the details will be given later, the shutter/stop drive section 14 drives the shutter 11 to alternately open and close the sections SR and SL so that the image-pickup device 13 acquires image-pickup data based on the passage of rays of light through the sections SR and SL, i.e., parallax images data DL and DR. The parallax image data DR and DL are then subjected to predetermined image processing by the image processing section 16 so that right and left parallax images are generated.

(Principles of Acquisition of Parallax images)

Figure 5:
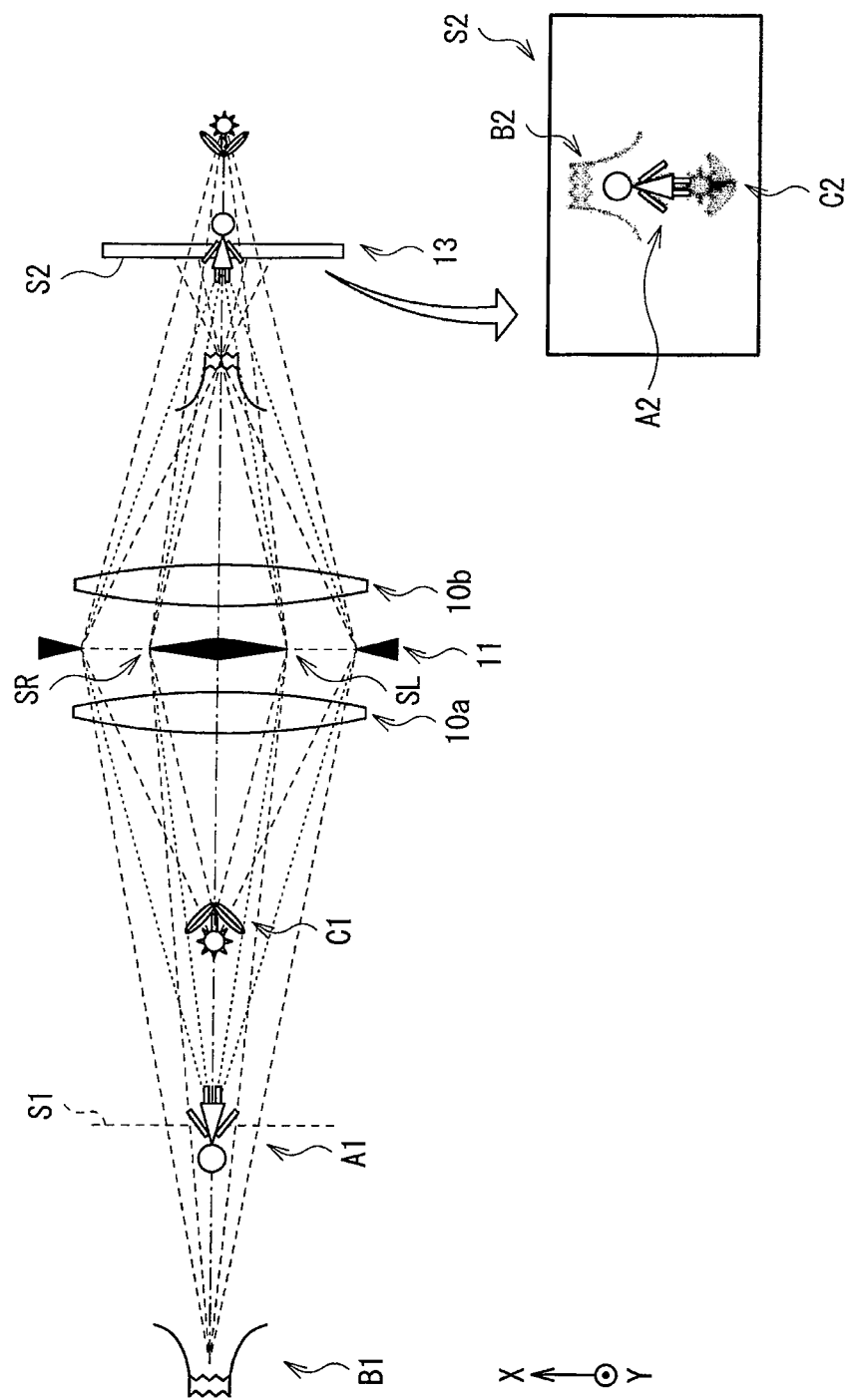
FIG. 5 is a schematic diagram for illustrating the principles of acquisition of a parallax image (with no splitting of a flux of light) in the imaging apparatus of FIG. 1.
Figure 6:
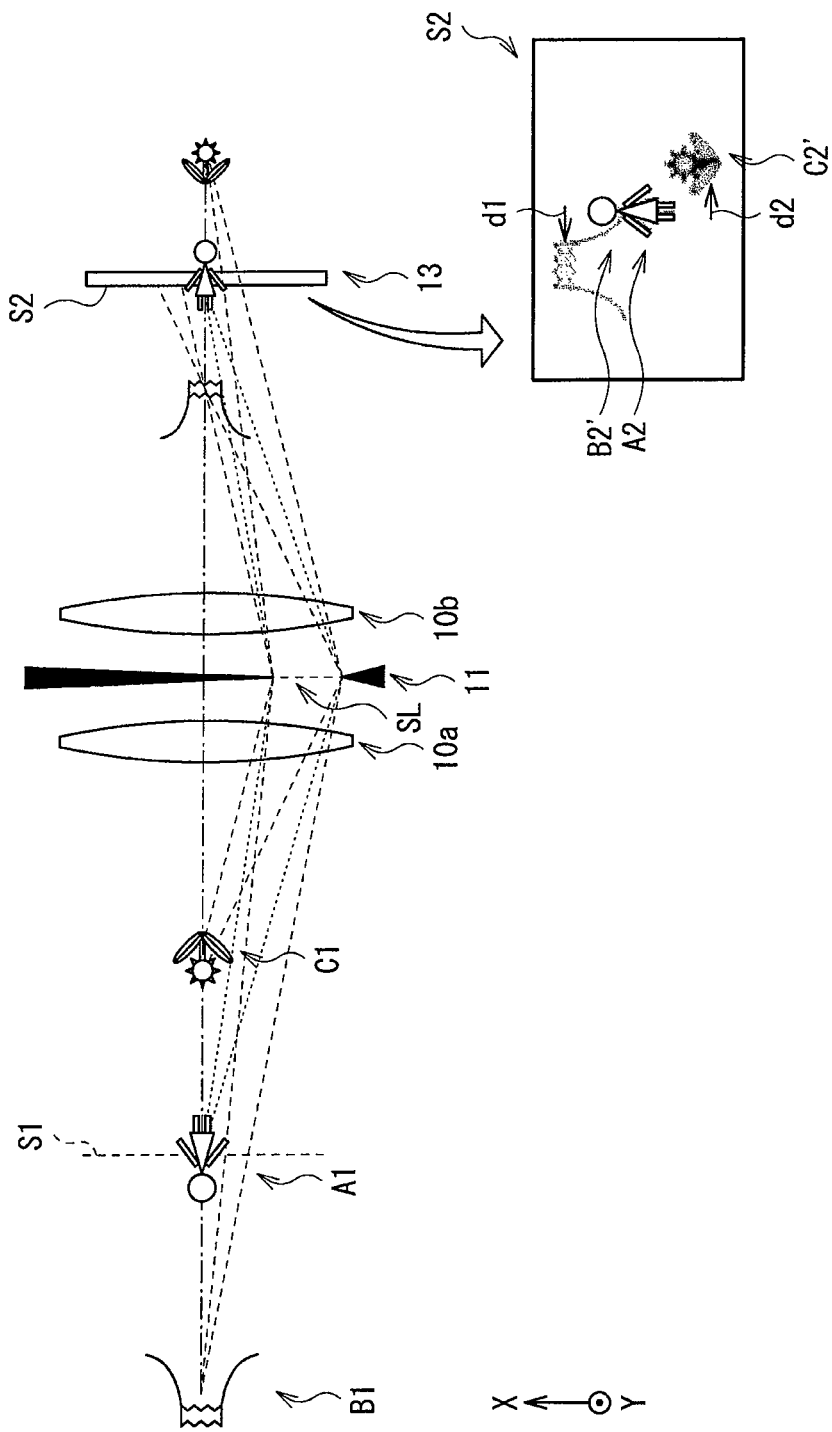
FIG. 6 is a schematic diagram for illustrating the principles of acquisition of a left parallax image in the imaging apparatus of FIG. 1.
Figure 7:
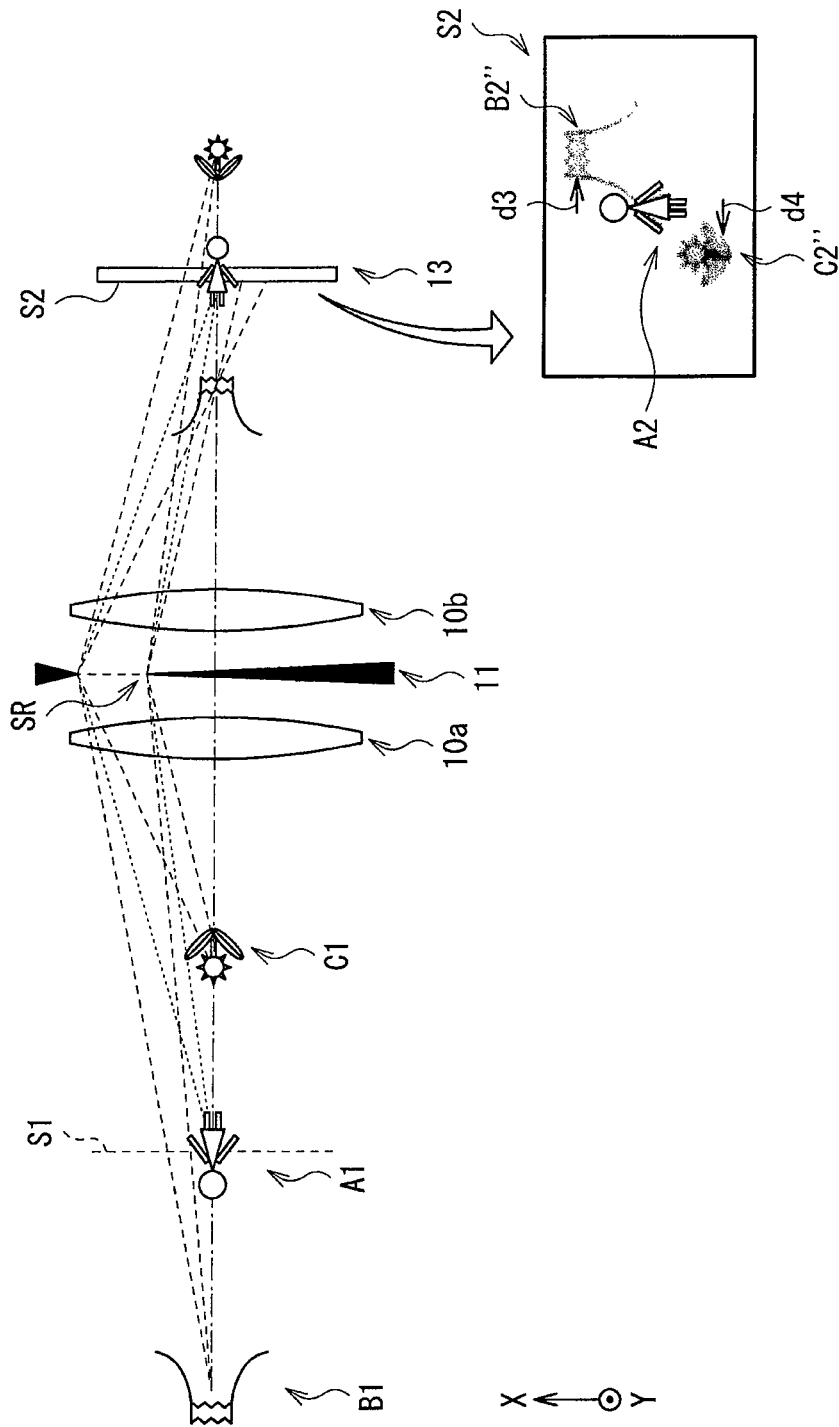
FIG. 7 is a schematic diagram for illustrating the principles of acquisition of a right parallax image in the imaging apparatus of FIG. 1.

By referring to FIGS. 5 to 7, the principles of acquisition of right and left parallax images are described now in detail. FIGS. 5 to 7 are each a view of the imaging apparatus 1 viewed from above the Y axis. For simplicity, the aperture stop 12 is not shown, and is assumed to be in the state of without limitation on the passage of a flux of light.

First of all, by referring to FIG. 5, described is an image formed with received light when the sections SR and SL of the shutter 11 are both open. In this case, three objects positioned along an optical axis at intervals are imaged onto the image-pickup device 13 in such a fashion as follows. Herein, such three objects are exemplified by a person A1, a distant object B1 such as a mountain, and a near object C1 such as a flower. The person A1 is assumed to be positioned on an in-focus plane, that is, conjugate plane S1 of the image-pickup lenses 10a and 10b. The distant object B1 is positioned at a farther position, i.e., on an opposite side of the person A1 from the image-pickup lens 10a, and the near object C1 is positioned at a closer position, i.e., on the same side of the person A1 as the image-pickup lens 10a. When the person A1 is on the in-focus plane S1 of the image-pickup lenses 10a and 10b as in this example, the image of this person A1 is formed at the center of a sensor plane S2, for example. The image of the distant object B1 which is not on the in-focus plane S1 is formed in front of the sensor plane S2, i.e., on the side closer to the image-pickup lens 10b, and the image of the near object C1 is formed in the rear of the sensor plane S2, i.e., on the opposite side of the sensor plane S2 from the image-pickup lens 10b. That is, on the sensor plane S2, an in-focus image A2 of the person A1 is formed, and a defocused (blurred) image B2 of the distant object B1 and a defocused image C2 of the near object C1 are formed.

(Left Parallax Image)

As to the three objects in such a positional relationship as described above, when the optical path is controlled to be switched between right and left images of the three objects are formed on the sensor plane S2 in such manners that differ from another, as below. That is, when the shutter/stop drive section 14 controls the shutter 11 to open the section SL but to close the section SR, for example, the left side of an area in the vicinity of the pupil plane serves as the optical path for light transmission thereover, and the right side thereof is blocked as shown in FIG. 6. In this case, as to the person A1 positioned on the in-focus plane S1, even if the right side of the area is blocked as such, i.e., even if only the left side of the area serves as the optical path, his or her image is formed on the sensor plane S2 similarly to the case as described above, i.e., both the sections SR and SL are open. On the other hand, the resulting images B2' and C2' of the distant object B1 and the near object C1 both of which are not on the in-focus plane S1 are formed on the sensor plane S2. The image B2' is formed at a position shifted from the position of the image B2 toward a direction d1, whereas the image C2' is formed at a position shifted from the position of the image C2 toward an opposite direction d2. As such, the image-pickup device 13 acquires left parallax image data DL.

(Right Parallax Image)

On the other hand, when the shutter/stop drive section 14 controls the shutter 11 to open the section SR but to close the section SL, the right side of the area in the vicinity of the pupil plane serves as the optical path for light transmission thereover, and the left side thereof is blocked as shown in FIG. 7. Also in this case, as to the person A1 positioned on the in-focus plane S1, his or her image is formed on the sensor plane S2, and as to the resulting images B2" and C2" of distant object B1 and the near object C1 both of which are not on the in-focus plane S1 are formed on the sensor plane S2. The image B2" is formed at a position shifted from the position of the image B2 toward a direction d3, whereas the image C2" is formed at a position shifted from the position of the image C2 toward an opposite direction d4. Herein, these moving directions d3 and d4 are opposite in direction to the moving directions d1 and d2 when the section SL is open. As such, the image-pickup device 13 acquires right parallax image data DR.

As described above, in the imaging apparatus 1, the shutter 11 is partitioned into two right and left sections SR and SL, and by these sections SR and SL being alternately changed to open and close, right and left parallax images may be acquired. Because these right and left parallax images create parallax, stereoscopic viewing is realized with such right and left parallax images by any predetermined technique as described above, e.g., polarization, field-sequential, and projector.

(Magnitude of Parallax between Parallax Image for Right Eye and Parallax Image for Left Eye)

The issue here is that the parallax images as above create parallax with respect to any imaging target not in focus. To be specific, when the optical path is controlled to be switched between right and left as described above, the resulting images of the distant object B1 and the near object C1 are shifted in position. This position shift (displacement) of the formed images corresponds to the parallax created between the right and left parallax images.

Figure 8:
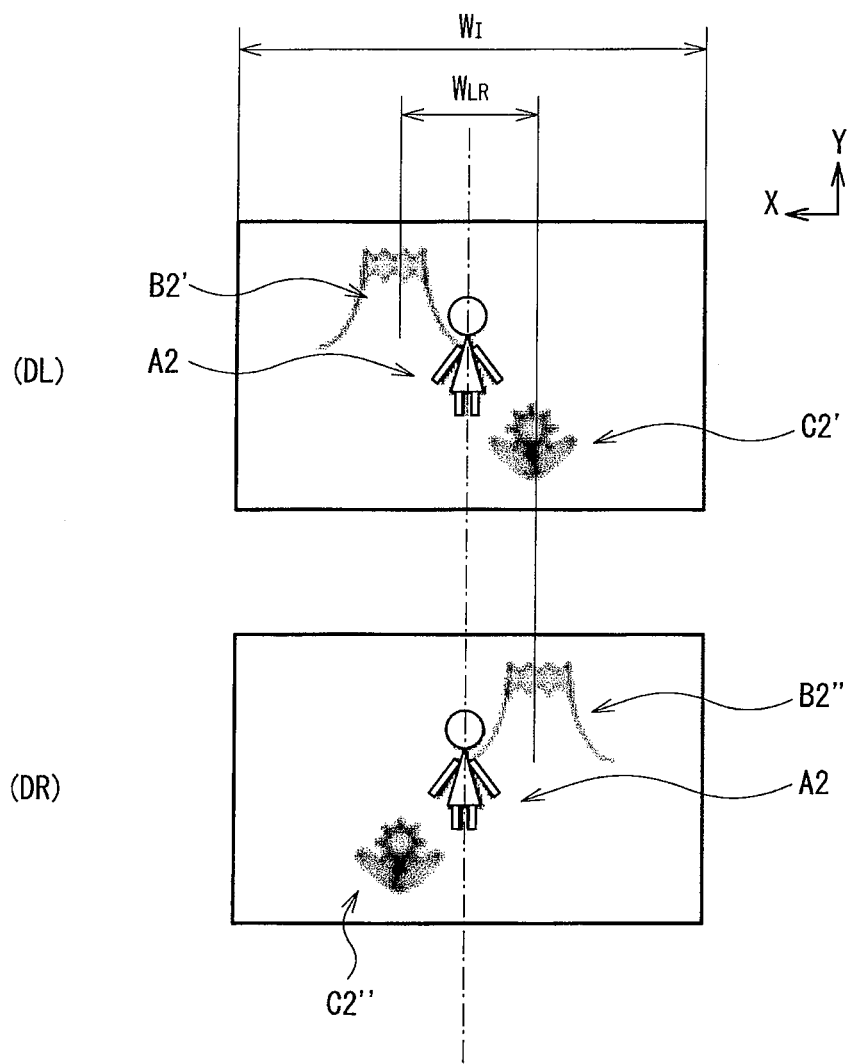
FIG. 8 is a schematic diagram for illustrating the magnitude of parallax between the right and left parallax images.

As exemplarily shown in FIG. 8, in the left parallax image DL, parallax is created due to an amount of displacement WLR in the right-and-left direction between a distant object B2' in the left parallax image DL and a distant object B2" in the right parallax image DR, i.e., due to a distance between the center of gravity of the distant object B2' and that of the distant object B2". In the below, the ratio between the amount of displacement WLR and a width WI in the X-axis direction of the light-receiving surface of the image-pickup device 13, i.e., WLR/WI, is defined as a magnitude of parallax. The people's stereoscopic depth perception changes in proportion to this magnitude of parallax. Therefore, if the magnitude of parallax is maintained constant, the stereoscopic depth perception is substantially maintained constant.

(Relationship Between Magnitude of Parallax and Center of Gravity G)

Figure 9:
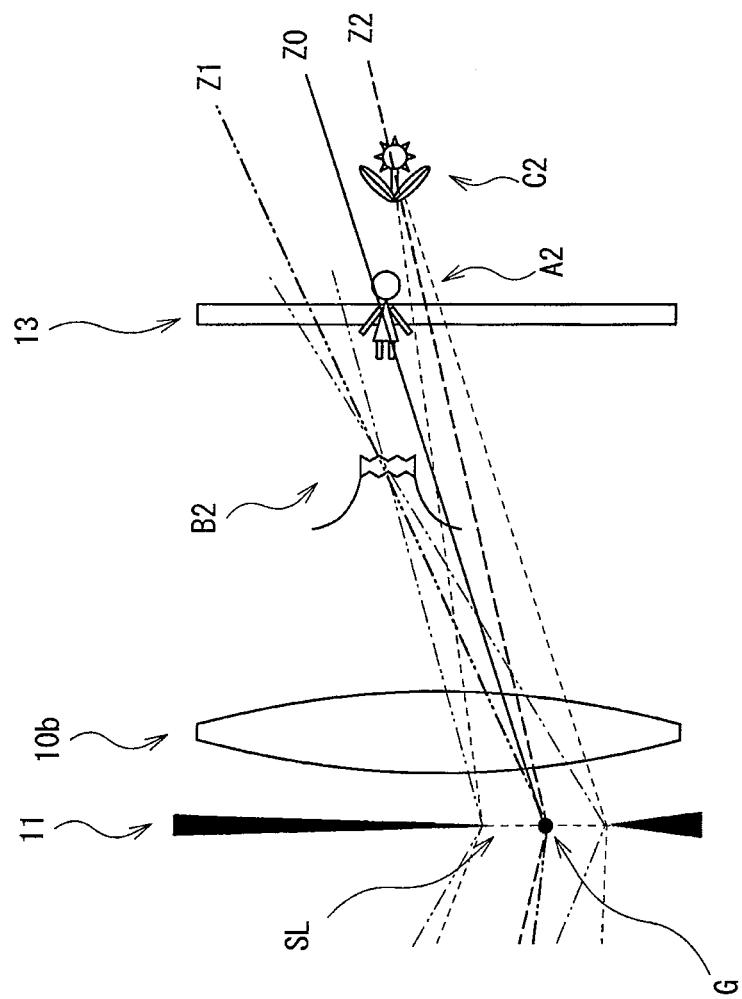
FIG. 9 is a schematic diagram for illustrating, on an XZ plane, the center of gravity in the open section (left section) of the shutter.

FIG. 9 shows an optical axis passing through the center of gravity of the image object when the section SL is opened but the section SR is closed in the shutter 11, for example. The XY plane in the section SL includes a specific point G where optical axes (z0, z1, and z2) all pass through. The optical axes herein are those passing through the centers of gravity of images of the objects, i.e., a person A2, a distant object B2, and a near object C2, respectively. It means that, no matter if the image of the object is in focus or out of focus on the image-pickup device 13, i.e., no matter where the image of the object is positioned, the center of gravity thereof is on the optical axis passing through the specific point G in the section SL. This specific point G corresponds to the "center of gravity" of the planar figure of the section SL. In the below, this point G is referred to as center of gravity G in the section SL, and exemplified is a case where only the section SL of the two sections SR and SL is open unless otherwise specified.

As such, through control over the position of the center of gravity G in the open section SL, the images of the objects in each parallax image allowed to be controlled in position of the center of gravity. The parallax is created as described above based on the amount of horizontal position shift of the formed images between the right and left parallax images, i.e., based on the distance between the center of gravity of an object image and that of another object image. It is thus known that the magnitude of parallax, i.e., stereoscopic depth perception, becomes controllable through control over the position of the center of gravity G as such. Herein, the stereoscopic depth perception based on the magnitude of parallax is desirably set as appropriate in accordance with the viewing distance or others from the display screen.

(Operation of Light Amount Adjustment Using Aperture Stop 12)

In this embodiment, during acquisition of right and left parallax images for stereoscopic viewing use as such, the shutter/stop drive section 14 drives the aperture stop 12 so that the light amount is adjusted, i.e., the brightness is adjusted. For driving of the aperture stop 12 at this time, utilized is the relationship between the center of gravity G and the magnitude of parallax described above. In the below, the operation of light amount adjustment considering the center of gravity G as such is described in detail by way of comparison with a comparison example.

(Center of Gravity G with Fully-Open Aperture Stop 12 (Fundamental Center of Gravity G0))

Figure 10:
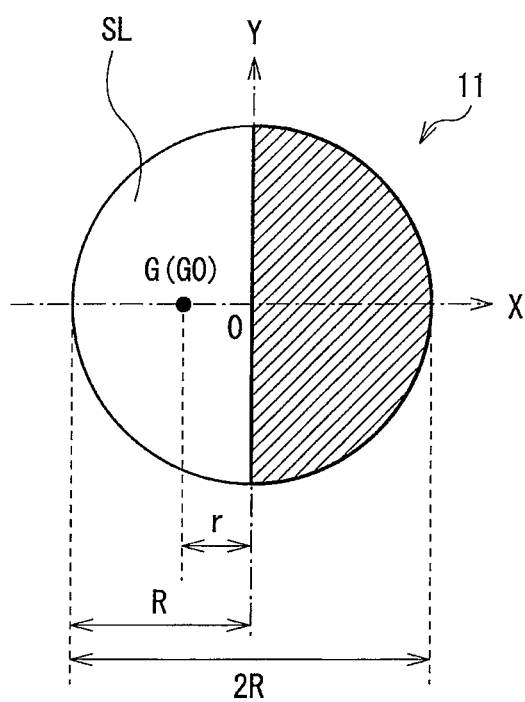
FIG. 10 is a schematic diagram for illustrating, on the XY plane, the center of gravity in the open section (left section) of the shutter.

FIG. 10 is a diagram schematically showing the center of gravity G on the XY plane in the section SL. In this case, the section SL where a flux of light passes is the left half portion of the shutter 11, i.e., in the shape of a semicircle. The center of gravity G thus is the center of gravity of the semicircle. Accordingly, assuming that the coordinates of the center of gravity G are (−r, 0), and the XY plane figure of the shutter 11 has the radius R, r in the center of gravity G is expressed by the following equation 1. This tells that r changes depending on the radius R. The center of gravity G (−r, 0) expressed by this equation 1 is assumed as being the fundamental center of gravity G0.

$$r = 4R/3\pi \qquad 1$$

Note that, in this specification, the term of "center of gravity" denotes the center of gravity of a plane figure as described above, but more in detail, is assumed to denote the center of gravity with the following properties A to D and theorems E and F.

A. The center of gravity is the center of weight (mass), and the plane figure is considered to be balanced at the center of gravity.

B. If a figure D can be divided into two figures of D1 (with area value S1) and D2 (with area value S2), a point of internally dividing, in the ratio of S2:S1, a line segment connecting the figures D1 and D2 at their centers of gravity is the center of gravity of the figure D.

C. The center of gravity is retained by the similarity transformation. That is, if a figure D' is transformed into the figure D as a result of the similarity transformation, the center of gravity of the figure D is transformed to the center of gravity of the figure D'.

D. The center of gravity of a figure symmetric with respect to a point is located at the center of the symmetry, and the center of gravity of a figure symmetric with respect to a line is located on an axis of symmetry.

E. The center of gravity of a triangle is an intersection point of medians.

F. Assuming that the center of gravity of a figure Dn is at Gn, when n→∞ (infinite) is satisfied, i.e., when n is closer to ∞, if the figure Dn→D and the center of gravity Gn→G are satisfied, the center of gravity of the figure Dn is at G.

As such, the center of gravity is understood as being the average of positions of all spots within a figure (in this example, XY plane figure). Therefore, if an object and the image thereof are similar in entire shape to each other, it is understood that the object and the image thereof share the same center of gravity.

Comparison Example

Figure 11A:
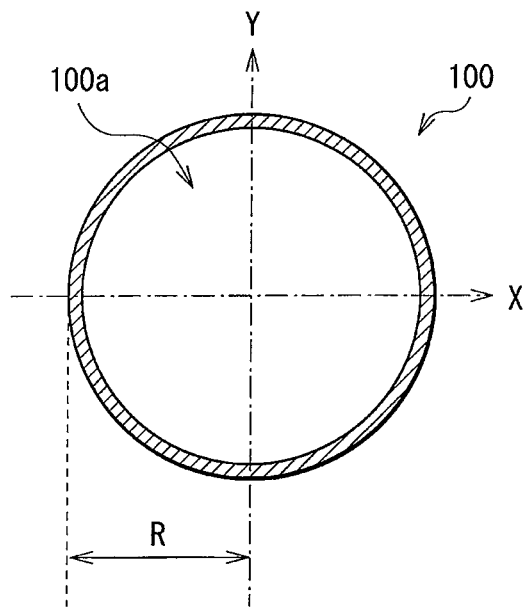
FIGS. 11A and 11B are each a schematic diagram of an aperture stop in a comparison example, showing the configuration thereof in a planar view, and specifically
Figure 11B:
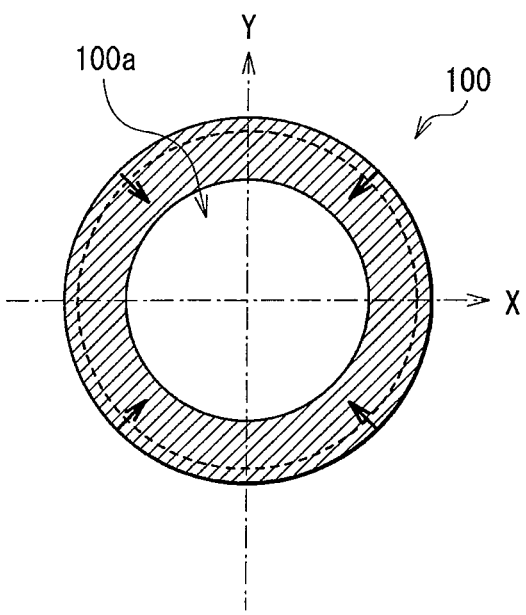

FIGS. 11A and 11B each show the configuration of an XY plane of an aperture stop (aperture stop 100) in a comparison example. The aperture stop 100 is formed with a circular aperture 100a. The aperture 100a has the radius R when it is fully open (FIG. 11A), and by reducing the size (radius) of the aperture 100a, the passage of a flux of light is limited (FIG. 11B).

Figure 12A:
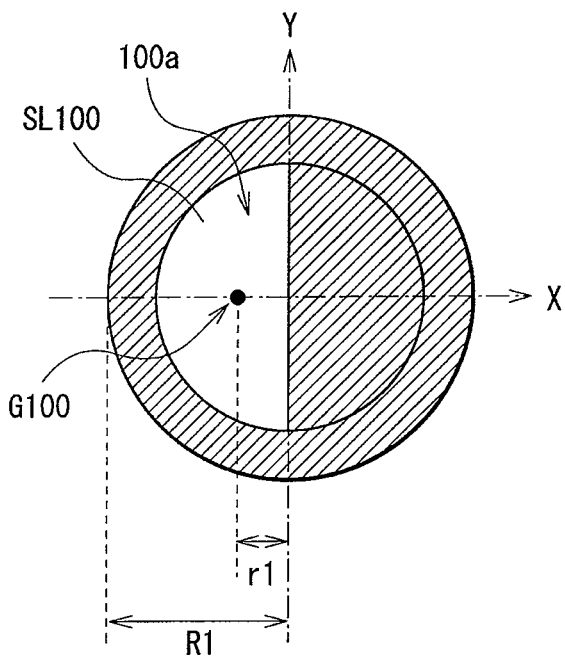
FIGS. 12A and 12B are each a schematic diagram showing the center of gravity in a geometric figure (the shape of the XY plane in the area where a flux of light passes) corresponding to the aperture of the aperture stop shown in FIGS. 11A and 11B, and specifically
Figure 12B:
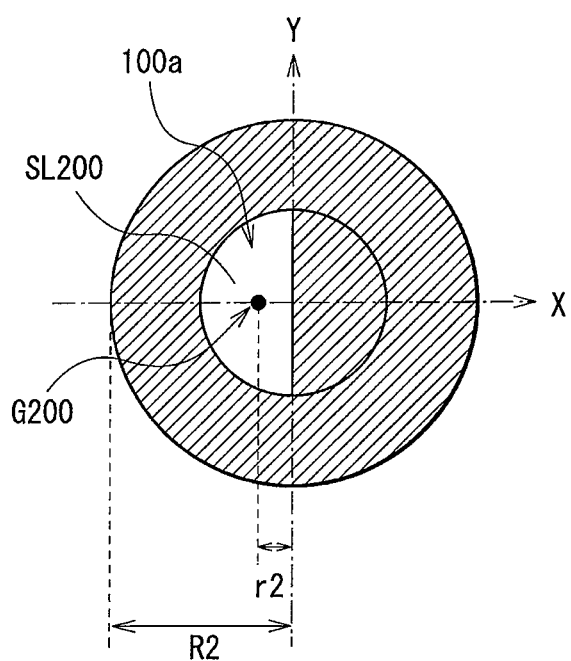

The concern here is that shortcomings arise as below when such an aperture 100a is actually used to adjust the amount of light. That is, as shown in FIG. 12A, when the right side is blocked and the left side is open, assuming that the aperture 100a has the radius R1 (<R), r1 in the center of gravity G100 (−r1, 0) of a light-passing region SL100 is dependent on the radius R1 similarly to the above. Moreover, as shown in FIG. 12B, also when the aperture 100a has the radius R2 (<R1) smaller than the radius R1 in the above case, r2 in the center of gravity G200 (−r2, 0) of a light-passing region SL200 is dependent on the radius R2. As such, when adjustment of the amount of light is performed through reducing the radius of the aperture 100a, the center of gravity in each light-passing region is shifted to another position from the position of the fundamental center of gravity G0 which is the center of gravity in the case that the light-passing region is fully open. Therefore, in the comparison example of using a circular aperture stop to adjust the amount of light, the degree of radius reduction of the aperture stop affects the magnitude of parallax in the resulting parallax images. As an example, if the aperture is reduced in size, i.e., if the values of r and R are reduced, the amount of displacement (magnitude of parallax) is reduced for object images in the resulting parallax images. Therefore, the stereoscopic depth perception is accordingly impaired, i.e., the resulting images look rather two-dimensional with no depth. Note that such a change of magnitude of parallax after the adjustment of the amount of light is similarly caused not only by the circular aperture stop but also by an aperture stop with a polygonal aperture.

Embodiment

On the other hand, in the embodiment, the shutter/stop drive section 14 drives the aperture stop 12 by utilizing the relationship between the center of gravity G and the magnitude of parallax described above. To be specific, when partially blocking the section SL by the blades of the aperture stop 12, the shutter/stop drive section 14 controls the aperture stop 12 such that, on the XY plane, the center of gravity G of the light-passing region does not shift i.e., the center of gravity G remains at the position of the fundamental center of gravity G0 described above. The light-passing region in the section SL is defined by the blades APL1 and APL2 or the blades APR1 and APL2 of the aperture stop 12.

Figure 13A:
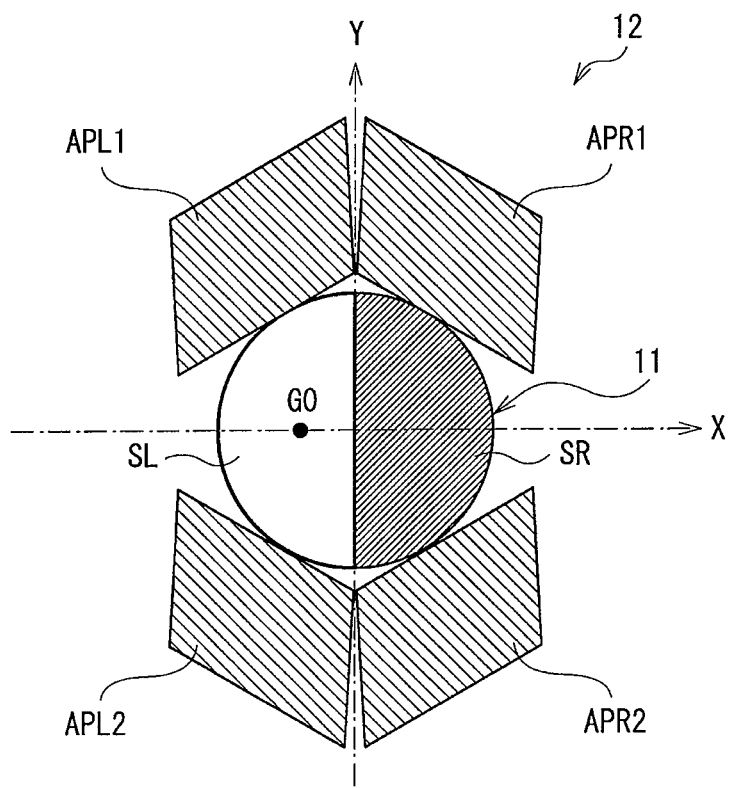
FIGS. 13A and 13B are each a schematic diagram for illustrating the operation of light amount adjustment using the aperture stop of FIG. 1, and specifically
Figure 13B:
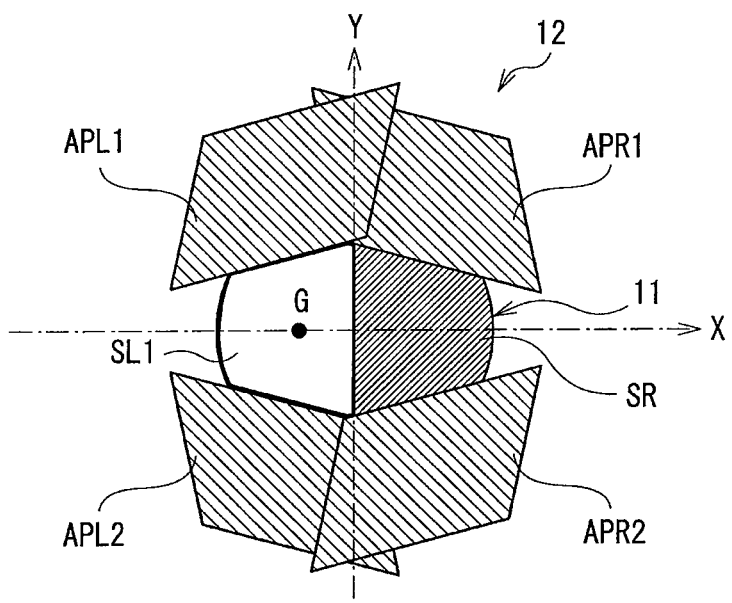

As shown in FIGS. 13A and 13B, for example, the shutter/stop drive section 14 drives the aperture stop 12 in the fully-open state, i.e., in the state of not blocking at all the section SL, to block partially the section SL. At this time, the area SL1 in the section SL is defined by the aperture stop 12. The shutter/stop drive section 14 controls the four blades AP of the aperture stop 12 such that the center of gravity G coincides with the fundamental center of gravity G0 as in the fully-open section SL. For the actual use, two of these four blades AP, i.e., APL1 and APL2, are used to limit the passage of a flux of light in the section SL, thereby adjusting the amount of light. Note that, as will be described later, for the control over the blades APL1 and APL2, the blades APL1 and APL2 are preferably tilted or/and positioned symmetrically to the X axis such that the section SL1 becomes symmetric to the X axis. Moreover, preferably, the passage of a flux of light is limited to a larger extend in the Y-axis direction than in the X-axis direction, i.e., along which the sections SR and SL are arranged, (in this example, the section SL is blocked more in the up-and-down direction than in the right-and-left direction). As such, the aperture stop 12 may be controlled more easily with the need to consider only the displacement of the center of gravity G on the X axis, i.e., X coordinate thereof.

To be specific, the blades AP are each controllably tilted, positioned (spaced from the others), or others such that the center of gravity G in the section SL1 coincides with the center of gravity G0 in the section SL, i.e., a point at the coordinates $(-4R/3\pi, 0)$ in the XY plane. For control as such, the center of gravity G in the section SL1 is found as below by utilizing the properties of the center of gravity as described above. That is, the section SL1 is partitioned into a plurality of sub sections (small figures), and based on the individual center of gravity in each of the sub sections, i.e., through synthesizing all of the individual centers of gravity, the center of gravity G is found for the section SL1.

Figure 14:
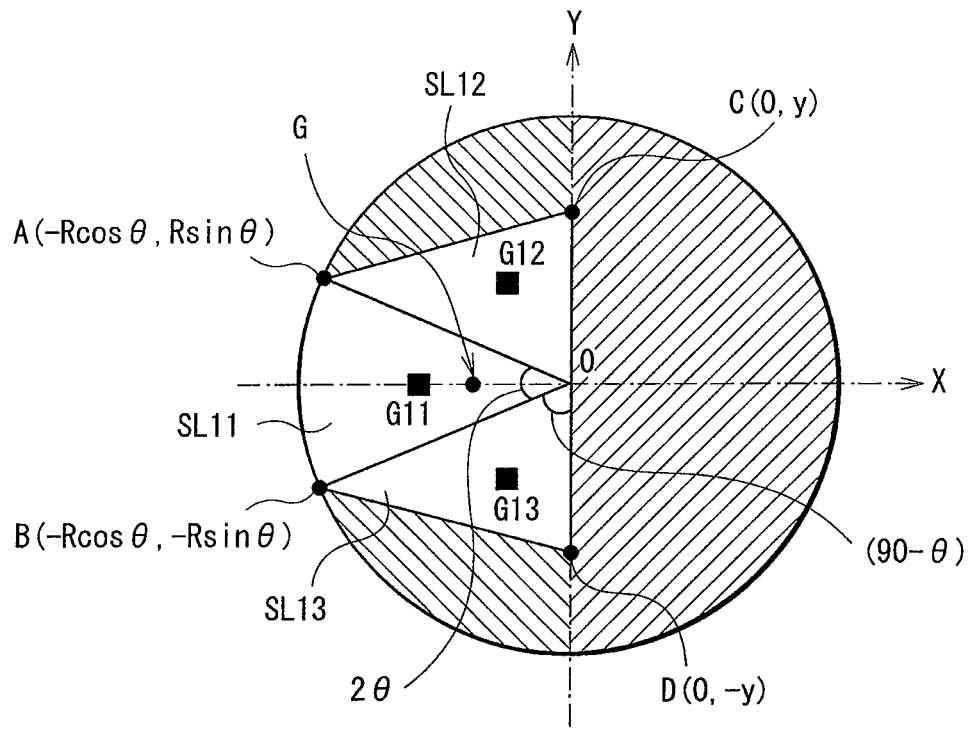
FIG. 14 is a schematic diagram for illustrating a procedure of computing the center of gravity for the aperture stop shown in FIG. 13B.

As an example, as shown in FIG. 14, first of all, the section SL1 is partitioned into three sub sections (sections SL11 to SL13) to find the center of gravity in each thereof. More in detail, the sub sections SL11 to SL13 are those respectively corresponding to three figures, i.e., a fan-shaped area OAB, and triangles OAC and OBD, formed by connecting a point of origin O with intersection points A, B, C, and D. The intersection points A and C are those of the blade APL1 at the perimeter of the section SL, and the intersection points B and D are those of the blade APL2 also at the perimeter of the section SL. Herein, such sub sections SL11 to SL13 are assumed to have the theoretical mass ratio of OAB:OAC:OBD=M11:M12:M13, and their centers of gravity are assumed to be G11, G12, and G13, respectively. In this example, M12=M13 is established considering the symmetry. Moreover, the point A is assumed to have coordinates $(-R\cos\theta, R\sin\theta)$, and the point B is assumed to have coordinates $(-R\cos\theta, -R\sin\theta)$.

[Specifically, assuming that the central angle between line segments OA and OB is $2\theta$, the coordinates of the center of gravity G11 in the fan-shaped section SL11 are expressed by the following expression 2.

$$\text{Coordinates of Center of Gravity } G11:(-2R\sin\theta/3\theta, 0) \qquad 2$$

Moreover, assuming that the point A has the coordinates $(-R\cos\theta, R\sin\theta)$, and the point C has the coordinates $(0, y)$, the coordinates of the center of gravity G12 in the triangular section SL12 are expressed by the following expression 3. Similarly, assuming that the point B has the coordinates $(-R\cos\theta, -R\sin\theta)$, and the point D has the coordinates $(0, -y)$, the coordinates of the center of gravity G13 in the triangular section SL13 are expressed by the following expression 4.

$$\text{Coordinates of Center of Gravity } G12:(-R\cos\theta/3, (y+R\sin\theta)/3) \qquad 3$$

$$\text{Coordinates of Center of Gravity } G13:(-R\cos\theta/3, -(y+R\sin\theta)/3) \qquad 4$$

Figure 15:
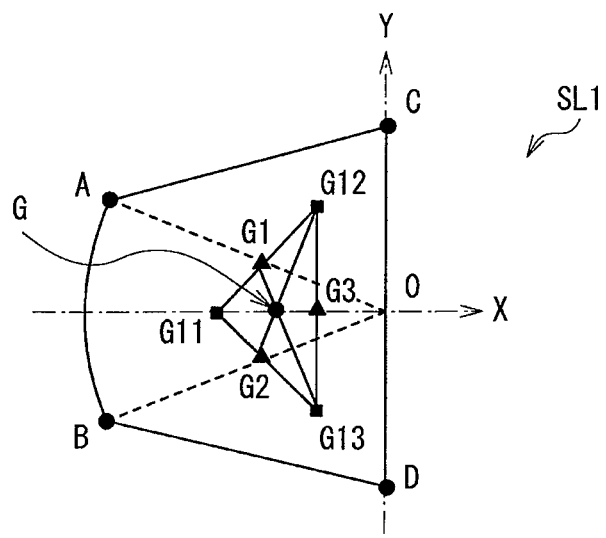
FIG. 15 is a schematic diagram for illustrating the procedure of computing the center of gravity subsequent to the procedure of FIG. 14.

Thereafter, as shown in FIG. 15, the centers of gravity G11 to G13 found as above for the sub sections SL11 to SL13 are subjected to coordinate synthesis. At this time, first of all, the centers of gravity G11 and G12 in the sections SL11 and SL12 are subjected to the coordinate synthesis, and then the centers of gravity G11 and G13 in the sections SL11 and SL13 are subjected to the coordinate synthesis. Lastly, the centers of gravity G12 and G13 in the areas SL12 and SL13 are subjected to the coordinate synthesis. As a result, the center of gravity as a result of the coordinate synthesis performed to the centers of gravity G11 and G12, i.e., center of gravity G1, coincides with a point of internally dividing, in the ratio of M12:M11, a line segment connecting the centers of gravity G11 and G12 considering the properties of the center of gravity or others described above. Similarly, the center of gravity as a result of the coordinate synthesis performed to the centers of gravity G11 and G13, i.e., center of gravity G2, coincides with a point of internally dividing, in the ratio of M13:M11, a line segment connecting the centers of gravity G11 and G13. Herein, the value of M12 is equal to the value of M13, so the center of gravity G3 as a result of the coordinate synthesis performed to the centers of gravity G12 and G13 coincides with a midpoint between the centers of gravity G12 and G13, and is positioned on the X axis.

Thereafter, by connecting the centers of gravity G1 and G13, the centers of gravity G2 and G12, and the centers of gravity G3 and G11 each by a line segment, an intersection point of these three line segments is equivalent to the center of gravity G in the entire area, i.e., the section SL.

As such, for the center of gravity G calculatable as such to coincide with the center of gravity G0 described above, the shutter/stop drive section 14 adjusts the amount of light while changing the coordinates of the above-described points A to D, i.e., while changing the tilt angles, the positions, and others of the blades APL1 and APL2. By driving the aperture stop 12 such that the center of gravity G remains at the same position, e.g., coincides with the center of gravity G0 in the fully-open state, the amount of light may be adjusted while maintaining the magnitude of parallax constant, because of the above-described relationship between the center of gravity and the magnitude of parallax.

As described above, in the embodiment, the shutter 11 is controlled to alternately open and close the sections SR and SL so that the image-pickup device 13 acquires image-pickup data based on the passage of rays of light through the sections SR and SL of the shutter 11. At this time, the shutter/stop drive section 14 drives the aperture stop 12 such that the passage of rays of light in the open section of the shutter 11 is limited to a larger extent in the Y-axis direction orthogonal to the X-axis direction along which the sections SR and SL are arranged than in the X-axis direction. As a result, the open section becomes less changeable dimensionally in the direction along which the sections SR and SL are arranged, e.g., in the horizontal direction (right-and-left direction), so that the amount of displacement is reduced for object images in the parallax images to be generated based on the image-pickup data as above. As such, for acquiring a plurality of parallax images, the amount of light may be adjusted with control over any degree change of parallax in the resulting parallax images. This is applicable not only to the adjustment of the amount of light as such but also to the depth of focus (depth of field).

Furthermore, when the shutter/stop drive section 14 drives the aperture stop 12, desirably, the center of gravity G remains at the same position in the portion enclosed by the blades AP in each of the sections SR and SL no matter how much the sections SR and SL are blocked, i.e., no matter how much the amount of light is adjusted. If this is the case, in the direction along which the sections SR and SL are arranged, i.e., the horizontal direction or the right-and-left direction, the amount of light is adjusted while maintaining the amount of displacement between the resulting parallax images constant. As such, the magnitude of parallax is controlled to be fixed more easily.

(Extent of Magnitude of Parallax Understood as "Fixed")

Figure 16:
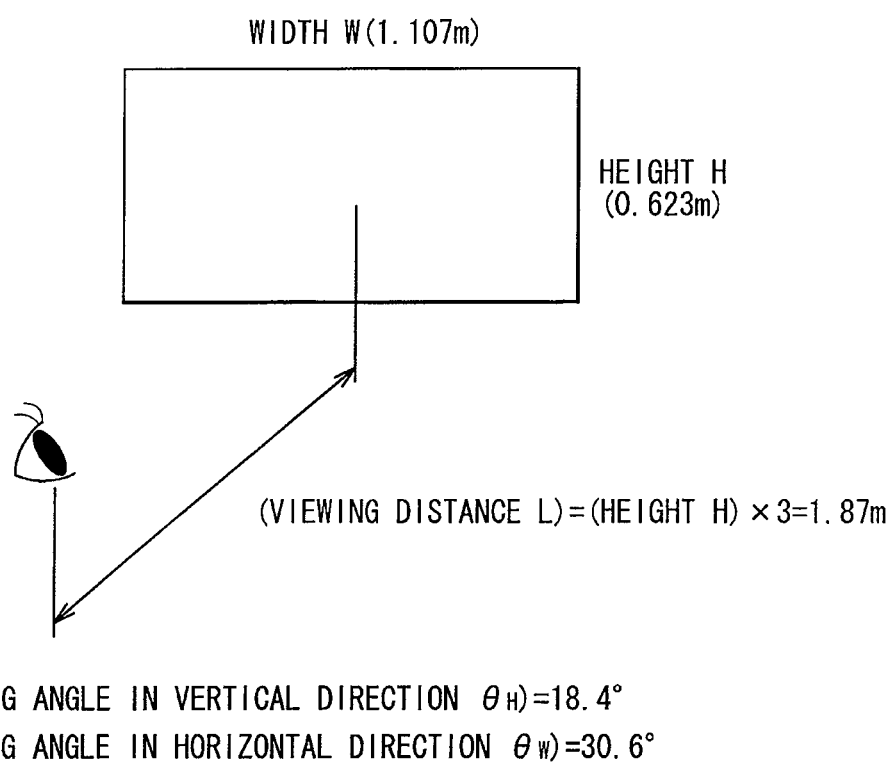
FIG. 16 is a schematic diagram for illustrating the extent of variations allowed for the center of gravity.

The magnitude of parallax as above, i.e., the stereoscopic depth perception, is desirably set as appropriate based on the viewing distance from the display screen, for example. In the below, by referring to FIG. 16, described is the extent that is understood as fixed for the magnitude of parallax. Exemplified here is a case where currently-popular high-definition (HDTV) picture with the aspect ratio of 16:9 is displayed. As an example, with a 50-inch display having the screen height H (=0.623 m), when the viewing distance L thereof is three times longer than the screen height, i.e., =1.87 m, the viewing angle θW in the right-and-left direction (horizontal direction) is 30.6°, and the viewing angle θH in the up-and-down direction (vertical direction) is about 18.4°. This viewing angle in the up-and-direction falls within a range of viewing angle that is most used by people (effective viewing angle 20° or lower). Such an example includes Toyohiko Hatada, Haruo Sakata, and Hideo Kusaka, "Induced Effect of Direction Sensation and Display Size Basic Study of Realistic Feeling with Wide Screen Display", The Journal of the Institute of Television Engineers of Japan, Vol. 33, No. 5, pp. 407 to 413 (1979).

Herein, the resolution of such high-definition video (1920× 1080 pixels) is set such that a user with visual acuity of 1.0 may not perceive the display units of pixels when the viewing distance L is three times longer than the screen height H. Herein, the "visual acuity of 1.0" is the resolution corresponding to the viewing angle of 1 minute based on the criteria for visual field testing using so-called Landolt rings. The term of visual acuity generally denotes the central visual acuity which is defined as a visual acuity at the fovea located in the center of the macula region of the retina of the eyeball. The fovea gives an optical visual acuity. Compared with the central visual acuity as such, the peripheral visual acuity (visual acuity for the area outside of the line of sight) is very poor, e.g., a deviation of 2° from the center (line of sight) causes a reduction of peripheral visual acuity to 0.4, and a deviation of 5° from the center causes a reduction of peripheral visual acuity to 0.1. Moreover, a deviation of 10° from the center results in the peripheral visual acuity of about 0.05.

Considering above-mentioned matters, the resolution in the right-and-left direction is calculated as below. At a gaze point on the display, the visual acuity is 1.0 (resolution of 1 minute) that is equivalent to the central visual acuity, and is also equivalent to the distance being 0.05% of the screen width W. In the range of ±2° for the gaze point, the visual acuity is 0.4 (resolution of 2.5 minutes), which is equivalent to the distance being 0.12% of the screen width W. Similarly, in the range of ±5° for the gaze point, the visual acuity is 0.1 (resolution of 10 minutes), and the distance is of 0.49% of the screen width W, and in the range of ±10° for the gaze point, the visual acuity is 0.05 (resolution of 20 minutes), and the distance is of 0.98% of the screen width W. That is, when a user is looking at an arbitrary gaze point on the screen, the image therearound is reduced in resolution. As such, even if the center of gravity is moved to an extent equal to or lower than the resolution described above, because such a change is not substantially perceived by human eyes, the center of gravity may be understood as "fixed".

As described above, in such a case, i.e., a user with visual acuity of 1.0 uses a high-definition display with the aspect ratio of 16:9, and the viewing distance L is three times longer than the screen height H, the viewing angle in the up-and-down direction is about 18°. This viewing angle falls within the range of effective viewing angle, i.e., 20° or smaller, and when the user gazes at the center of the screen, he or she hardly perceives if the center of gravity moves to an extent equal to or lower than about 1% of the screen width. Accordingly, the center of gravity is understood as "fixed".

Modified Example

Figure 17A:
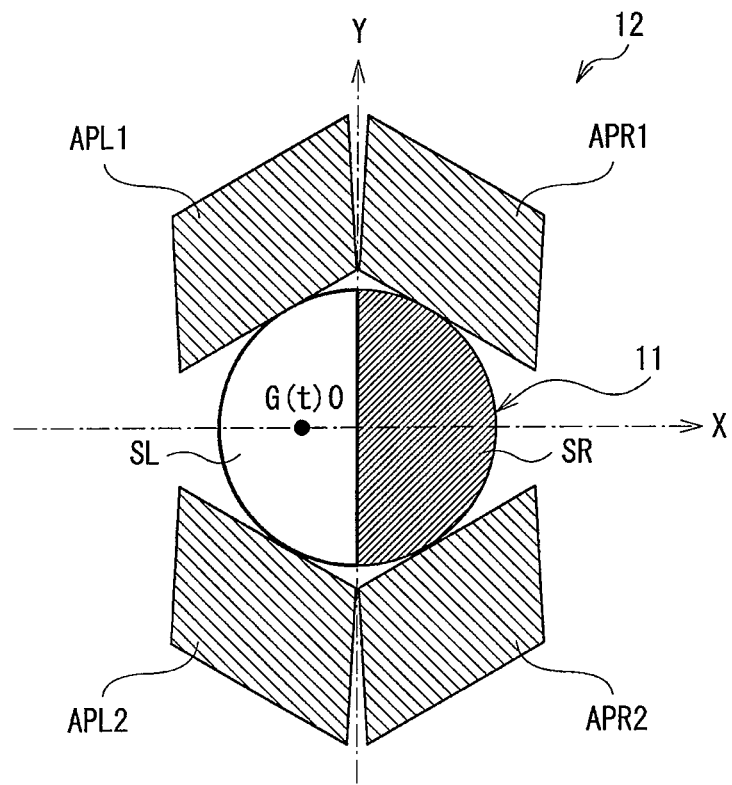
FIGS. 17A and 17B are each a schematic diagram for illustrating the computation of the center of gravity in a modified example of the application, and specifically
Figure 17B:
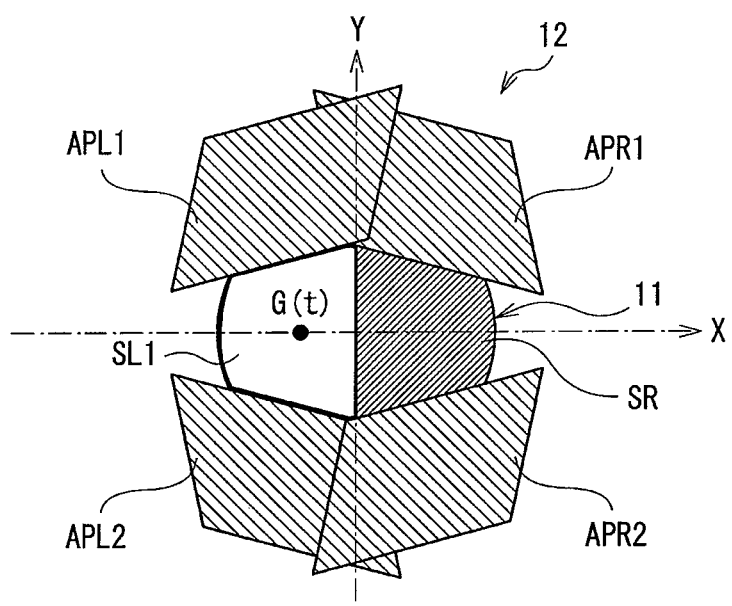

In the embodiment above, described is to control the magnitude of parallax with parallax images by driving the aperture stop 12 such that, during an adjustment of the amount of light using the aperture stop 12, the center of gravity remains at the same position in the open section in each of the sections SR and SL. This is surely applicable also to a case where the transmittance of the image-pickup lenses 10a and 10b is not uniform in the plane. If this is the case, coefficients may be stored in advance, which are those based on the relationship between the area and transmittance in the light-passing region. The aperture stop 12 may be then driven not to move the center of gravity represented by any of the coefficients based on the area and transmittance in the shutter-open portion to be limited by the aperture stop 12. As an example, the aperture stop 12 may be driven such that the center of gravity G(t)0 coincides with the center of gravity G(t). That is, the center of gravity G(t)0 is the one represented by any of the coefficients based on the entire area of the section SL and the transmittance thereof when the aperture 12 is fully open (FIG. 17A), and the center of gravity G(t) is the one represented by any of the coefficients based on the area of the section SL1 and the transmittance thereof when the aperture stop 12 is partially blocked (FIG. 17B).

While the application has been described in detail with the embodiment and the modified example, the foregoing description is in all aspects illustrative and not restrictive thereto. It is understood that numerous other modifications and variations may be devised. That is, in the embodiment above and others, exemplified is the case of partitioning the shutter 11 into two areas arranged along the right-and-left direction, i.e., X-axis direction. The arrangement direction of the areas is not restrictive thereto, and the areas may be arranged along the up-and-down direction, i.e., Y-axis direction. Furthermore, the number of the areas for arrangement as such, i.e., the partition number of the shutter, is not restricted to two as described above, and may be three or more. If this is the case, three or more parallax images may be acquired.

Also exemplified in the embodiment above and others is the aperture stop 12 configured by the four blades AP each in the shape of a parallelogram. However, the number and the shape in a planar view of the blades AP are not restrictive thereto, and the blades AP may be provided more with the aim of performing more detailed control, or the side blocked by the blades AP may be shaped like a polygon or be curved instead of being linear. In either of these cases, as long as the aperture stop 12 is driven such that a flux of light is limited to a larger extent in the direction orthogonal to the direction along which the areas are arranged, i.e., the direction of creating parallax, the effects similar to those in the application may be achieved.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An imaging apparatus, comprising:
an image-pickup lens;
a shutter partitioned into a plurality of sections along a first direction and allowed to open and close for each of the plurality of sections;
a stop adjusting an amount of light; and
a drive section driving the shutter and the stop, wherein the drive section controls the shutter in such a manner that at least one section of the plurality of sections of the shutter is opened and remaining sections of the plurality of sections are closed, and drives the stop in such a manner that a position of center of gravity of the opened section of the shutter is maintained at a substantially fixed position.

2. The imaging apparatus according to claim 1, wherein the stop comprises a plurality of blades.

3. The imaging apparatus according to claim 2, wherein the drive section drives the plurality of blades in such a manner that the position of the center of gravity of the opened section of the shutter is maintained at the substantially fixed position.

4. The imaging apparatus according to claim 3, wherein the drive section drives the plurality of blades so as to be symmetrically located with respect to an axis along the first direction.

5. The imaging apparatus according to claim 1, wherein the stop comprises four blades, and the drive section adjusts amount of light in the opened section using two of the four blades.

6. The imaging apparatus according to claim 1, wherein the image-pickup lens has a distribution of transmittance where optical transmittance varies along a plane orthogonal to an optical axis of the image pickup lens, and the center of gravity is determined in consideration of the distribution of transmittance.

7. The imaging apparatus according to claim 1, wherein the first direction is horizontal or vertical, and a number of the plurality of sections is two.

8. The imaging apparatus according to claim 1, further comprising an image-pickup device performing acquisition of image-pickup data based on a flux of light passing through the image-pickup lens, the shutter and the stop, wherein the image-pickup data comprises first parallax image data for right eye and second parallax image data for left eye.

9. The imaging apparatus according to claim 1, wherein the substantially fixed position of the center of gravity lies in a range equal to or lower than 1% of width of a display screen.

10. The imaging apparatus according to claim 1, wherein the drive section drives the stop in such a manner that passage of a flux of light through the opened section is limited to a larger extent in a second direction than in the first direction, wherein the second direction is orthogonal to the first direction.

* * * * *